Dec. 11, 1934.　　　　　S. T. SMITH　　　　　1,984,236

GRADE INDICATOR FOR MOTOR VEHICLES AND THE LIKE

Filed March 29, 1934　　　4 Sheets-Sheet 1

Inventor

S. T. Smith

By Clarence A. O'Brien
Attorney

Dec. 11, 1934.　　　　S. T. SMITH　　　　1,984,236
GRADE INDICATOR FOR MOTOR VEHICLES AND THE LIKE
Filed March 29, 1934　　　4 Sheets-Sheet 2

Inventor
S. T. Smith
By Clarence A. O'Brien
Attorney

Dec. 11, 1934.  S. T. SMITH  1,984,236
GRADE INDICATOR FOR MOTOR VEHICLES AND THE LIKE
Filed March 29, 1934  4 Sheets-Sheet 3
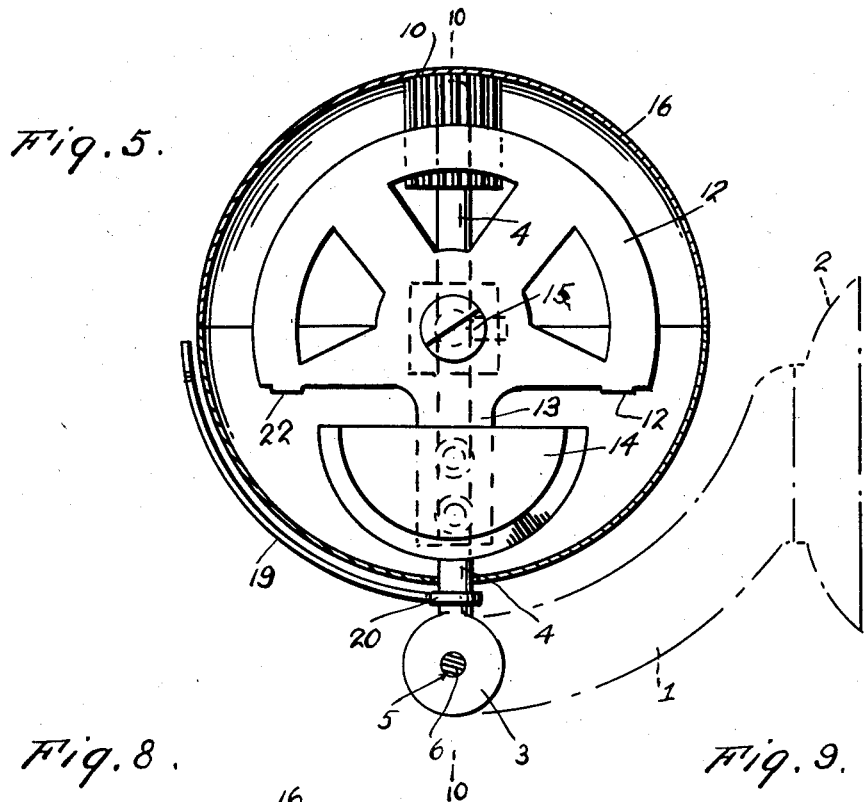
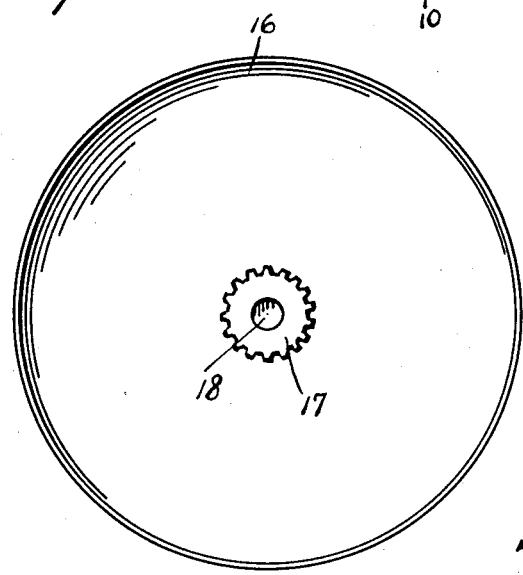
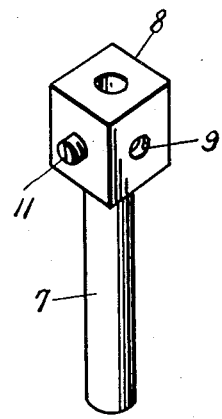
Inventor
S. T. Smith Dec. 11, 1934.  S. T. SMITH  1,984,236
GRADE INDICATOR FOR MOTOR VEHICLES AND THE LIKE
Filed March 29, 1934    4 Sheets-Sheet 4

Inventor
S. T. Smith
By Clarence A. O'Brien
Attorney

Patented Dec. 11, 1934

1,984,236

UNITED STATES PATENT OFFICE 1,984,236

GRADE INDICATOR FOR MOTOR VEHICLES AND THE LIKE

Sherwood Thomas Smith, Manchester, Conn.

Application March 29, 1934, Serial No. 718,063

3 Claims. (Cl. 33—215)

This invention relates to a device for indicating the steepness of a grade over which a motor vehicle or the like is traveling, the general object of the invention being to provide simple means for indicating the steepness of the grade so that the operator of the vehicle can ascertain by a glance at the device whether or not to shift gears.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 5 is a vertical sectional view through the device.

Figure 8 is a view looking into the top half of the sphere.

Figure 9 is a view of the headed sleeve.

Figure 1:
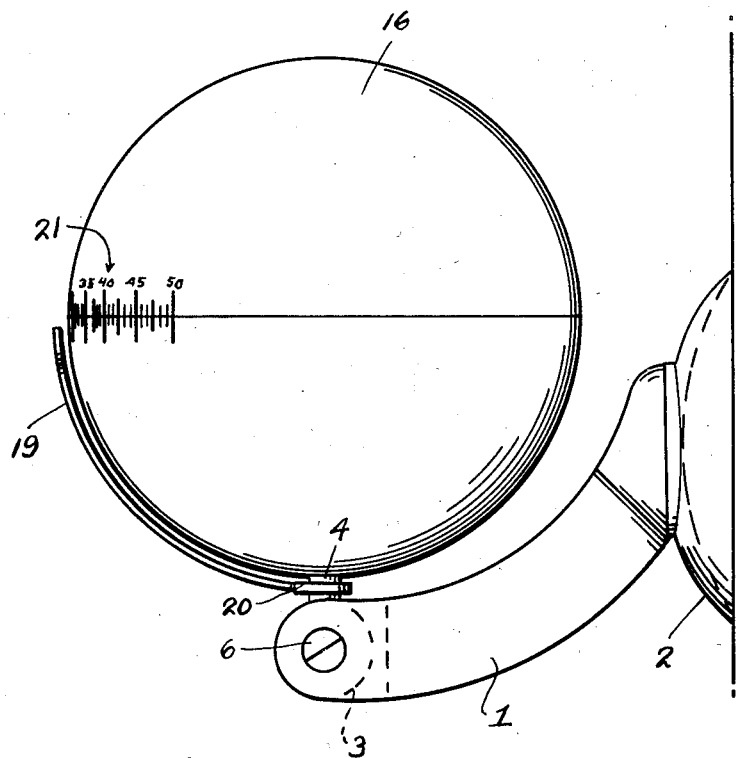
Figure 1 is a side view of the invention.
Figure 6:
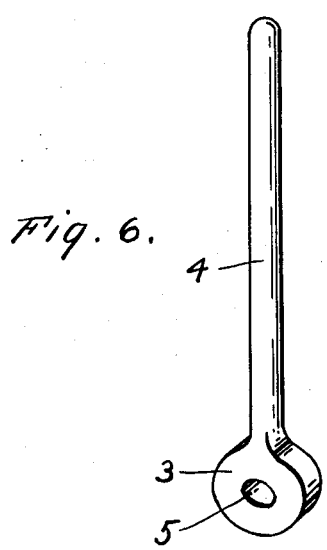
Figure 6 is a view of the shaft.
Figure 7:
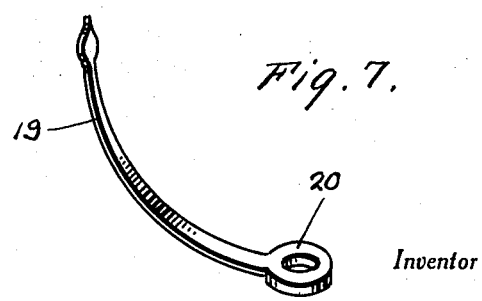
Figure 7 is a view of the pointer.
Figure 2:
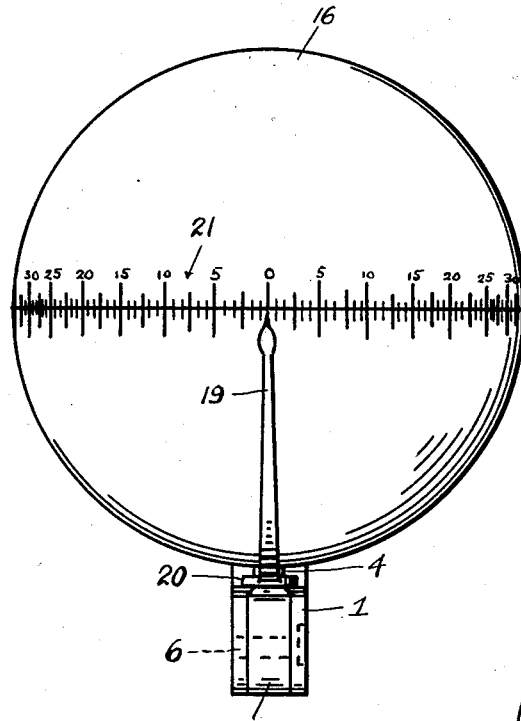
Figure 2 is a front view thereof.
Figure 3:
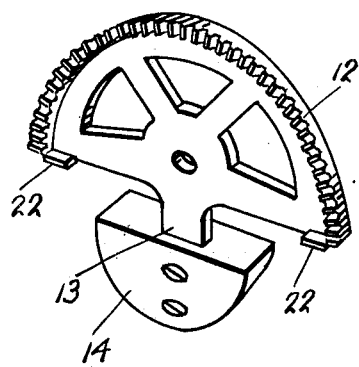
Figure 3 is a perspective view of the gear and weight.
Figure 4:
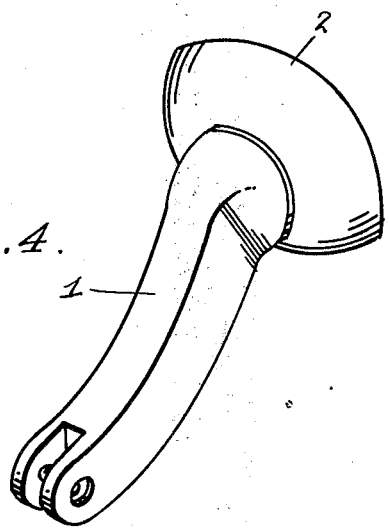
Figure 4 is a view of the supporting bracket and the vacuum cup.
Figure 10:
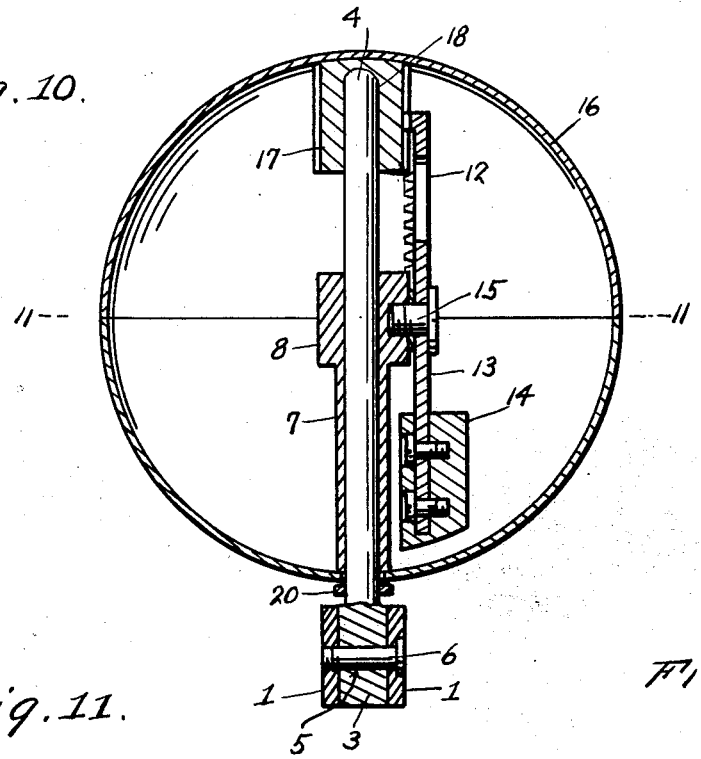
Figure 10 is a section on line 10—10 of Figure 5.
Figure 11:
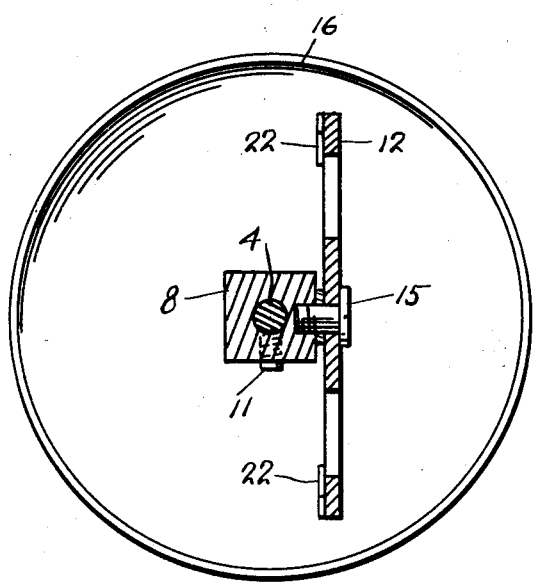
Figure 11 is a section on line 11—11 of Figure 10.
Figure 12:
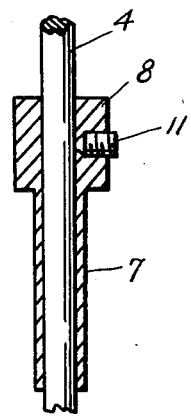
Figure 12 is a sectional view through the headed sleeve and showing the shaft passing therethrough.

In these drawings, the numeral 1 indicates a supporting bracket having a vacuum cup 2 attached to one end thereof so that this bracket can be supported from an instrument board or the like of a motor vehicle and the other end of the bracket is forked to receive the flat circular end 3 of a vertical shaft 4, said part 3 having a hole 5 passing therethrough for receiving a bolt 6 which passes through the prongs of the bracket so as to adjustably connect the shaft to the bracket. A sleeve 7 fits over a part of the shaft and has a head 8 on its upper end formed with a threaded hole 9 to receive a set screw 11 which fastens the sleeve and its head to the shaft. A segmental gear 12 has a depending stem 13 thereon to which a weight 14 is attached and said gear is rotatably supported from the head 8 by means of a stub shaft 15. Thus the weight will hold the gear in a certain position, but when the parts are tilted, the weight will cause movement of the gear on the shaft 15. A spherical body 16, formed of upper and lower sections suitably connected together, encloses the parts, as shown, and the lower section has a centrally arranged hole therein through which the shaft 4 passes. An elongated pinion 17 has one end fastened to the central part of the upper section and this pinion is formed with a socket 18 for receiving the upper part of the shaft 4 and in such a manner that the gear 17 can rotate on the shaft. This pinion or gear 17 meshes with the teeth of the segmental gear 12 so that the movement of this segmental gear 12 under the action of the weight 14 will impart movement to the gear 17 and thus to the spherical body.

A curved finger or pointer 19 has an eye 20 at one end thereof which encircles the lower part of the shaft 4 and the other end of this pointer cooperates with a scale 21 on the horizontal largest circumference of the spherical body. Thus it will be seen that as a vehicle to which the device is attached ascends or descends a grade, the weight 14 will swing in one direction or the other and thus cause movement of the gear 12 and this movement is imparted to the spherical body through means of the pinion 10 so that the scale will move relatively to the finger or pointer 19 and thus the operator of the vehicle can ascertain the steepness of the grade and thus tell whether or not to shift gears. The ratio of gears 12 and 17 should be approximately 4 to 1, so as to enable the scale to be made so that it can be readily observed by the driver of the vehicle.

Stops 22 are formed on the ends of the segmental gear 12 for engaging the pinion for keeping the two gears in mesh even though the device is roughly handled.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A device of the class described comprising a stationary shaft, a spherical member of hollow construction having a hole in its lower part through which the shaft passes, a pinion connected with the central portion of the top part of the spherical member and rotatable around the upper part of the shaft, a segmental gear rotatably supported from the shaft for movement about a horizontal axis, said segmental gear meshing with the pinion, a weight connected to the lower end of the segmental gear, a scale on the exterior part of the spherical member, and a pointer supported from the shaft and cooperating with the scale.

2. A device of the class described comprising a stationary shaft, a spherical member of hollow construction having a hole in its lower part through which the shaft passes, a pinion connected with the central portion of the top part of the spherical member and rotatable around the upper part of the shaft, a segmental gear rotatably supported from the shaft for movement about a horizontal axis, said segmental gear meshing with the pinion, a weight connected to the lower end of the segmental gear, a scale on the exterior part of the spherical member, a pointer supported from the shaft and cooperating with the scale, a supporting bracket, and means for adjustably connecting the lower end of the shaft to said bracket.

3. A device of the class described comprising a supporting bracket, a vertically arranged shaft having its lower end connected therewith, a spherical member of hollow construction having a centrally arranged hole in its lower part through which the shaft passes, a pinion connected to the central part of the upper portion of the spherical member and rotatably supported by the upper end of the shaft, a sleeve encircling a part of the shaft and located in the spherical member and having a head at its upper end connected with the shaft, a stub shaft carried by the head and horizontally arranged, a spherical gear rotatably supported by the stub shaft and engaging the pinion, a weight connected to the lower part of the segmental gear, a curved pointer having one end connected to the lower part of the first mentioned shaft, and a scale horizontally arranged on the central portion of the exterior part of the spherical member and cooperating with the pointer.

SHERWOOD T. SMITH.